Nov. 18, 1952 V. D. GRONDONA 2,618,067

TOPOGRAPHICAL RANGE RECORDER

Filed Feb. 19, 1945 9 Sheets-Sheet 1

INVENTOR

Valentin Domingo Grondona,

BY

ATTORNEYS

Nov. 18, 1952 V. D. GRONDONA 2,618,067

TOPOGRAPHICAL RANGE RECORDER

Filed Feb. 19, 1945 9 Sheets-Sheet 2

INVENTOR

Valentin D. Grondona

BY [signature]

ATTORNEYS

Nov. 18, 1952 V. D. GRONDONA 2,618,067

TOPOGRAPHICAL RANGE RECORDER

Filed Feb. 19, 1945 9 Sheets-Sheet 3

INVENTOR
Valentin D. Grondona
BY [signature]
ATTORNEYS

Nov. 18, 1952 V. D. GRONDONA 2,618,067

TOPOGRAPHICAL RANGE RECORDER

Filed Feb. 19, 1945 9 Sheets-Sheet 4

INVENTOR
Valentin D. Grondona

BY

ATTORNEYS

TOPOGRAPHICAL RANGE RECORDER

Filed Feb. 19, 1945 9 Sheets-Sheet 5

INVENTOR

Valentin D. Grondona

BY

ATTORNEYS

Nov. 18, 1952 V. D. GRONDONA 2,618,067

TOPOGRAPHICAL RANGE RECORDER

Filed Feb. 19, 1945 9 Sheets-Sheet 6

INVENTOR
Valentin D. Grondona
BY [signature]
ATTORNEYS

INVENTOR
Valentin D. Grondona
BY [signature]
ATTORNEYS

Valentin D. Grondona INVENTOR
BY [signature]
ATTORNEYS

Valentin D. Grondona INVENTOR

BY [signature]

ATTORNEYS

Patented Nov. 18, 1952

2,618,067

UNITED STATES PATENT OFFICE 2,618,067

TOPOGRAPHICAL RANGE RECORDER

Valentin Domingo Grondona, Rosario, Argentina

Application February 19, 1945, Serial No. 578,707
In Argentina January 24, 1945

12 Claims. (Cl. 33—20)

The present invention relates to a surveying instrument for making topographic surveys, provided with a range finder having a binocular telescope so as to obviate to a large extent, if not totally, the employement of assistants, the use of field note-books, drawing office work and calculations, as has been required hitherto, and which means a demand for expert operators and the necessary personnel.

Surveying instruments of prior art are open to the objection that as between the terrain surveyed and the final plan errors are introduced either due to the human factor or to the mechanical and optical construction of the instrument or to both, and are furthermore subject to the disadvantages arising out of sacrifice of precision due to their design as out-door instruments and/or to the effects of careless or unskilful manipulation.

The purpose of the present invention is therefore to provide a surveying instrument which will overcome all of the said objections and disadvantages and enable a plan to be easily obtained on site with a very high degree of accuracy and in which any incidental errors due for example to wear shall be capable of correction in an exceedingly simple manner.

The invention accordingly relates to a surveying instrument provided with a range finder having a binocular telescope, said instrument comprising a device for displacing a parallax measuring member in a corresponding range of said parallax, said member operating in connection with a transmission mechanism which reduces the range of a point of the terrain in a given ratio, said transmission mechanism being in operative relationship with means for obtaining a record of the survey, which means is coupled with a mechanism and a setting and adjustment device, said mechanism being so designed that it converts any displacement impressed on its driving member into an inversely proportional displacement of its driven member.

For simplicity the mechanism just described will hereinafter be referred to as an "inversor mechanism" and this term is to be understood as meaning a special device, such as Peaucellier's diamond, by means of which the resultant movement is inversely proportional to the causing movement, as is well known by those skilled in the art.

Such a comparatively simple instrument allows a high degree of accuracy to be attained and at the same time permits the compensation of any errors by a single subsequent operation, for instance by changing the position of an indicating gauge.

Hence it is a principal object of the present invention to provide a surveying instrument of the kind described capable of achieving in all the operations, the maximum economy of time, since it is enough to sight one point in order automatically to obtain its coordinates, while at the same time noting it in the plan.

Another object is to provide a reducing mechanism which translates proportionally the conditions established in the mathematical calculation, without using the known parts designed as monograms, abaci or curvilinear guides, which generally, due to wear and tear or constructional defects give rise to systematic errors.

Another object is to provide means for obtaining the graphic conversion of the range-finding equation, including a reducing mechanism adapted to act on the principle of the "rule and compass" method, and having parts so constructed and arranged as to ensure the accuracy of the measurements.

A further object of the present invention is to provide in a range finder, means whereby various points of the terrain may be focussed without requiring such displacement of the reticles or lenses, as might alter the value of the angle of parallax, with the consequent errors in the distance. Said means shall also be capable of causing the increment of optical length required when observing objects near at hand, to be automatically produced when centering both images at one point of the stereoscopic field.

A still further object is to provide in a range finder, means for tracing contour lines without trials or interpolations thereby avoiding the many failures occurring in surfaces which have not been ruled.

Another object is to provide a range finder which shall be adapted when set in a given location to enable a plurality of successive plans to be made from a plurality of points of view and which shall comprise means for determining the successive point in a manner which does not rest upon that of those already obtained, thereby preventing possible personal errors made in one plan from influencing the remaining plans, when linking up the several plans.

Another object is to provide a range finder in which, for surveying visible terrain no human assistant of any kind is required, but only a virtual staff is brought into coincidence with the optical image of any object observed, thereby enabling surveys to be conducted irrespective of the accessibility of the terrain surveyed.

Another object is to provide a range finder so constructed and arranged as to enable the operator to make his survey, from a given point of view, without changing his position or adopting uncomfortable attitudes, except for such slight movements as will enable him to contemplate the landscape above the range finder, and observe both eye-pieces while still having his hands free for controlling the movements for range, elevation and azimuth.

Another object is to provide a range finder with binocular sighting means and adapted to be handled without requiring highly specialised knowledge of the subject.

A still further object is to provide an apparatus which will lend itself to the rapid laying out of parks, scattered pavilions, and the like.

Changes and variations may be made in the constructions shown and described without departing from the principles of the invention or sacrificing its chief advantages; hence the invention is not to be understood as limited to the precise structures shown in the drawings, in which Fig. 1 is a diagrammatic plan view of the general arrangement of one embodiment of my novel surveying instrument.

Figures 1, 2:
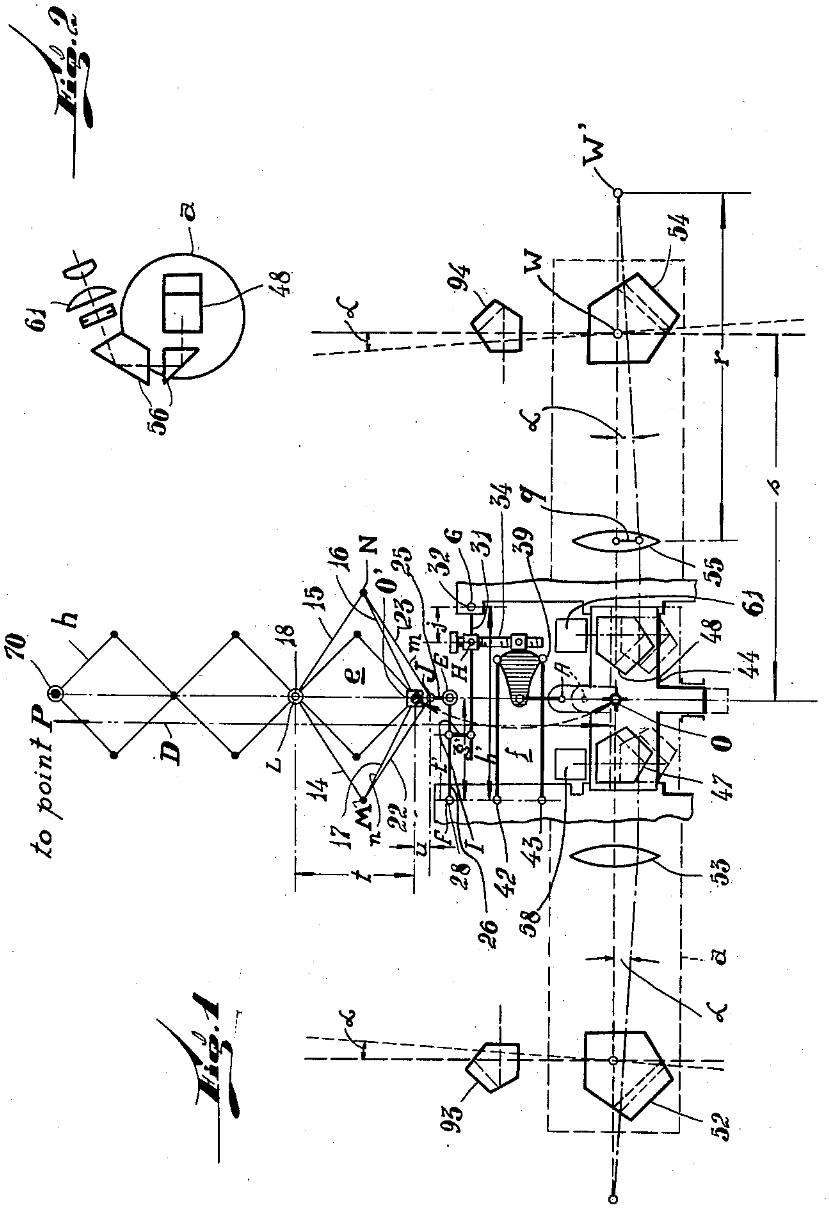
Fig. 2 is a diagrammatic side view of the telescope and eye-piece.

In the diagrammatical Figs. 1 and 2, beside the corresponding reference characters for the mathematical points, pivot distances, effective length of levers and the like, use is made of additional reference characters, which will facilitate the comprehension of the relationship of the theory with the following description of the actual embodiments and more particularly said latter additional reference characters will indicate the structural features such as rods, pins, levers and the like.

As may be seen from the drawings (Figs. 1 and 3) the surveying instrument comprises a binocular telescope $a$ which is rotary around the vertical axis 68 of the instrument, the intersection of which with the telescope axis being identified by reference character O in Fig. 1.

As may be seen from the diagram of Fig. 1, when adjusting the range finder on a point of the terrain, the lines of sight converge thereon forming parallactic angles $\alpha$. As the construction is symmetrical it will be sufficient to analyze the conditions obtaining on one side of the vertical midplane of the instrument bisecting the telescope axis. Two similar right angled triangles are formed by the rays; the first having vertices P, O and W which are respectively the point of the terrain observed, the center of the instrument and the one end of the datum line of the range finder; by "datum line" is to be understood the interception on the horizontal axis of a binocular telescope existing between the end prisms 52 and 54, said datum line constituting the main base for calculation and construction of the apparatus; and the second triangle has a vertex W' and the two sides $q$ and $r$, wherein point W' is the posterior focus of the object lens 55, and the virtual image of point W in prism 54, while $r$ is the focal distance of the object lens, and $q$ is the parallax of the point P.

Now if D is the distance from P to O, and $s$ is half the datum line of the range finder, we have the following proportion:

$$\frac{D}{s}=\frac{r}{q}$$

that is to say, $$D=\frac{r.s}{q}$$

Since $r$ and $s$ are constants, we may write $r.s=k$, wherein $k$ is a constant: that is $$D=\frac{k}{q} \qquad (1)$$

which gives the distance of the point P from the center O.

The line of sight from the point P of the terrain which passes after being reflected, in prism 54, through object lens 55 the posterior focus of which is indicated at W', is refracted in the object lens into a direction parallel to the optical axis. For measuring the parallax, the prism 48 is now displaced transversely to the optical axis an amount corresponding to said parallax $q$. By this means and considering now both sides of said midplane, the operator sees, according to Figs. 1 and 2, through eye-pieces 61, the stereoscopic image of the reticle 60 in coincidence with the perceived image of point P through prisms 56 and 48 as well as lens 55.

Equation 1 represents an inverse function. Consequently the displacements of the prism 48 follow a hyperbolic law. The structural problem consists in transmitting the necessary displacement to prisms 47 and 48, that is to say to the common platform 44 on which they are mounted, and which acts as the member adapted to measure the parallax, which member is at the same time adapted to transform the hyperbolic function of the displacement into a straight line law.

For this purpose an inversor mechanism is used, which is so arranged that a displacement imparted to the driving end member will be transformed into an inverse proportional displacement of the driven member. This is effected by means of the articulated system LMJNO′ in which the point O′ is fixed in the apparatus and on the same vertical line as the point O (somewhat like a Peaucellier diamond).

The six rods 14, 15, 16, 17, 22 and 23 (see also Fig. 8), which rods are linked together, form a kite and a rhombus, having one common side pair 14, 15. The rods 14, 15, 22 and 23 (the rhombus) are of equal length. The effective length between the pivots is designated by reference character $m$ (Fig. 1). Rods 16 and 17 are also of equal length and of different length with regard to the other four rods; the effective length of said two rods is designated by reference character $n$.

If $t$ denotes the length of the principal diagonal LO′ and $u$ denotes the distance O′J, there exists the relation:

$$u.t=m^2-n^2$$

and since $m$ and $n$ are constant magnitudes, we may write:

$$m^2-n^2=k'$$

wherein $k'$ is a constant. Hence $$t=\frac{k'}{u} \qquad (2)$$

When point L moves in direction OP, and since point O′ is fixed, the vertex J is displaced along the same straight line. Said vertex is connected, by means of a coupling member 25 with the articulation point E of a transmission lever system $f$. The movement of J towards platform 44 may be transmitted by means of levers EF and GH, coupled by a longitudinally slidable cursor I. In fact, said system of levers reduces the displacements of J according to a factor of proportionality $p'$ which is obtained from the relationship:

$$p'=\frac{g'}{t'}\cdot\frac{h'-t'}{j}=g'\frac{(h'-t')}{t'.j} \qquad (3)$$

wherein:

$p'$ is the relationship of the displacement between link JE (25) and articulation A, which links platform 44 (prisms supporting platform) with the lever system $f$.

$g'$ is the projection in abscissa (when lever 26 is inclined) of the distance between the axis of joints 27 and 28 of lever 26; and is the distance existing between the axis of joints 27 and 28 of lever 26 (when said lever 26 coincides with the axis of abscissa). Note: Similarly, by saying "projection in abscissa" in the definitions of the remaining magnitudes, this expression is to be understood as including for the part concerned two events similar to those specifically defined in the definition of magnitude $g'$.

$t'$ is the projection in abscissa of the distance between the axis of articulation of cursor I and axis of joint of pin 28, which distance may be varied at will.

$h'$ is the projection in abscissa of the distance between the axis of joints 28 and 32.

$j$ is the projection in abscissa of the distance between the axis of joint 32 of lever 31 and axis of articulation 33 of the adjusting screw 34.

The points F and G correspond to the axes of joints 28 and 32 (see also Figs. 8 and 9) which are fixed to the base plate of the apparatus. H denotes the middle point of the nut fixed to the lever 31 which transmits the movements of the latter to platform 44. Since the displacement of the platform 44 is effected to the extent of $q$, we thus have $$u=p'.q$$

which by substitution in the Formula 2 gives $$t=\frac{k'}{p'.q}$$

Comparing this with 1, we have $$\frac{D}{t}=\frac{k.p'}{k'}$$

Since the second member is a product between constant and parametric magnitudes, we can put $$\frac{k.p'}{k'}=S$$

wherein S is a parameter, and finally $$D=S.t \qquad (4)$$

a formula analogous to that for range-finding with annallagmatic telescope.

By coupling the vertex L to a drawing device $h$, we may transfer on to a drawing board located horizontally in front of the instrument, magnified projections of the radial lines which are directed from the apparatus axis 68 to various points of the terrain, and we are thus enabled to reconstruct a figure similar to the natural figure reduced to the horizon, to a scale determined by the value of $$S=\frac{s.r.p'}{m^2-n^2}$$

If S is determined at will (which is usual), we calculate $$p'=\frac{S(m^2-n^2)}{s.r}$$

and therefrom the necessary distance $t'$ of the cursor I on the lever EF $$t'=\frac{g'.h'}{(j.p'+g')}$$

where all values at the right of the equal sign are known.

When platform 44 is displaced to compensate for the parallax angle $\alpha$, the optical length of the system increases by a magnitude $q$. If we use objectives, the focal distance $r$ of which are equal to half the datum line of the range finder ($r=s$), the distance $q'$ from the main posterior focus (W) of the objective lens (53 or 55) to the conjugate of the object (W′) (which is the image of the object or of the surveyed point of the terrain always with regard to the same objective lens), will be equal to $q$, since according to the formula of the conjugate foci $$D.q'=r^2$$

and according to (1)

$$D.q=r.s=r^2$$

hence $$q'=q$$

We thus shall have managed an optical system the parts of which are naturally in accurate focus relationship. The importance of this achievement is considerable since in adjustable systems small errors of parallax produced by displacements of the reticles of the lenses, would detract from the accuracy of the drawing.

In order to produce the coincidence of the image of a point of the terrain with the reticle, a displacement of the reticle may be effected to the same extent, instead of carrying out the aforementioned displacement of platform 44; which could be done for instance with a similar inversor mechanism. This arrangement, has however the drawback that the eye of the operator becomes very tired, because it is forced to adjust the view-angle for a short distance.

As may be understood from the foregoing a slideable member (platform 44) necessary for measuring the parallax is coupled, by means of a suitable device, to a transmission mechanism (*e*, *f*) which reduces the distance of the terrain point in a given ratio, said transmission mechanism comprising the inversor mechanism (*e*). Said inversor mechanism may be adjusted, as will be later described, by means of a screw 34 and thus, by means of pivot 18, converts every movement impressed on it into an inversely proportional displacement of the driven member 25, and thereby solves the above mentioned problem.

Figure 3:
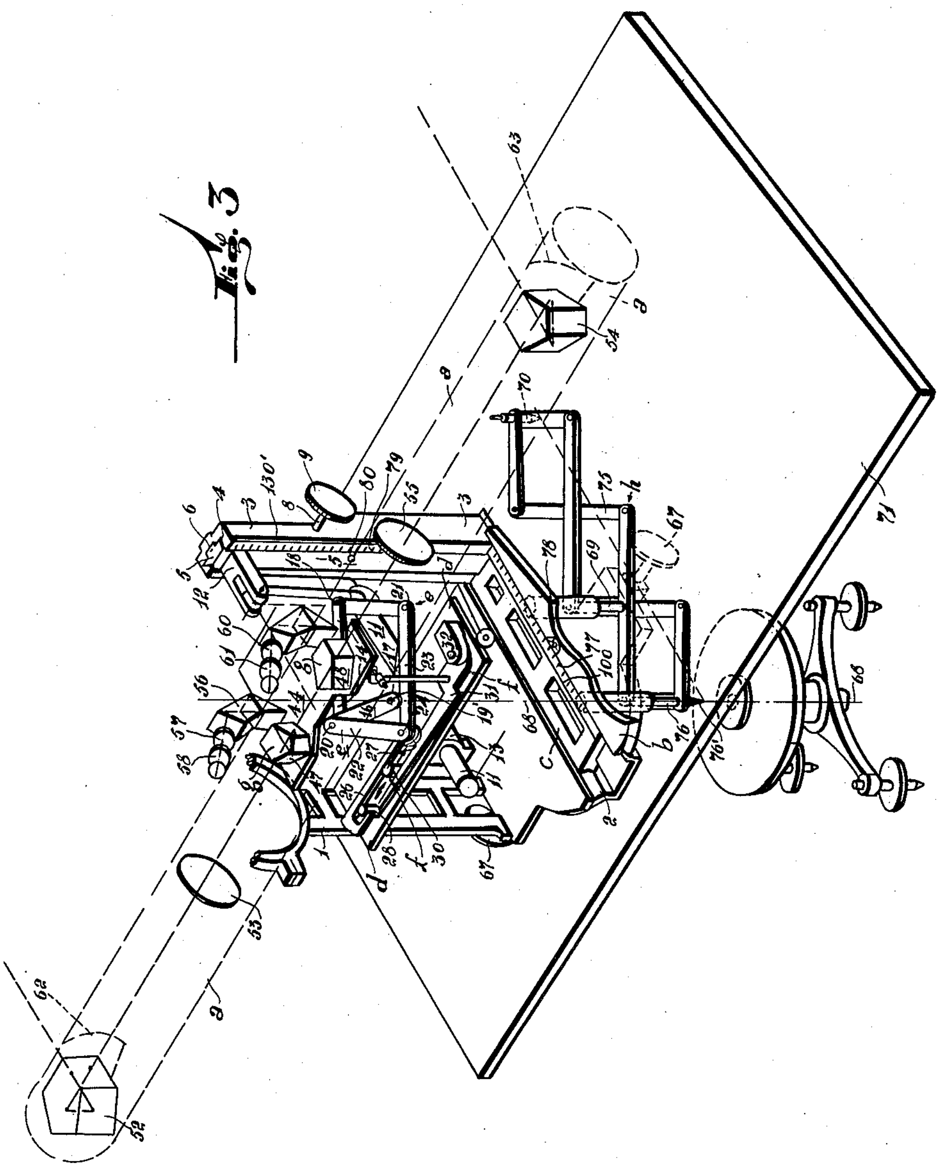
Fig. 3 is a general perspective view of the surveying instrument giving an idea of the manner in which the principal elements thereof are combined, some parts being shown in diagrammatic form and others being omitted for clearness.
Figure 4:
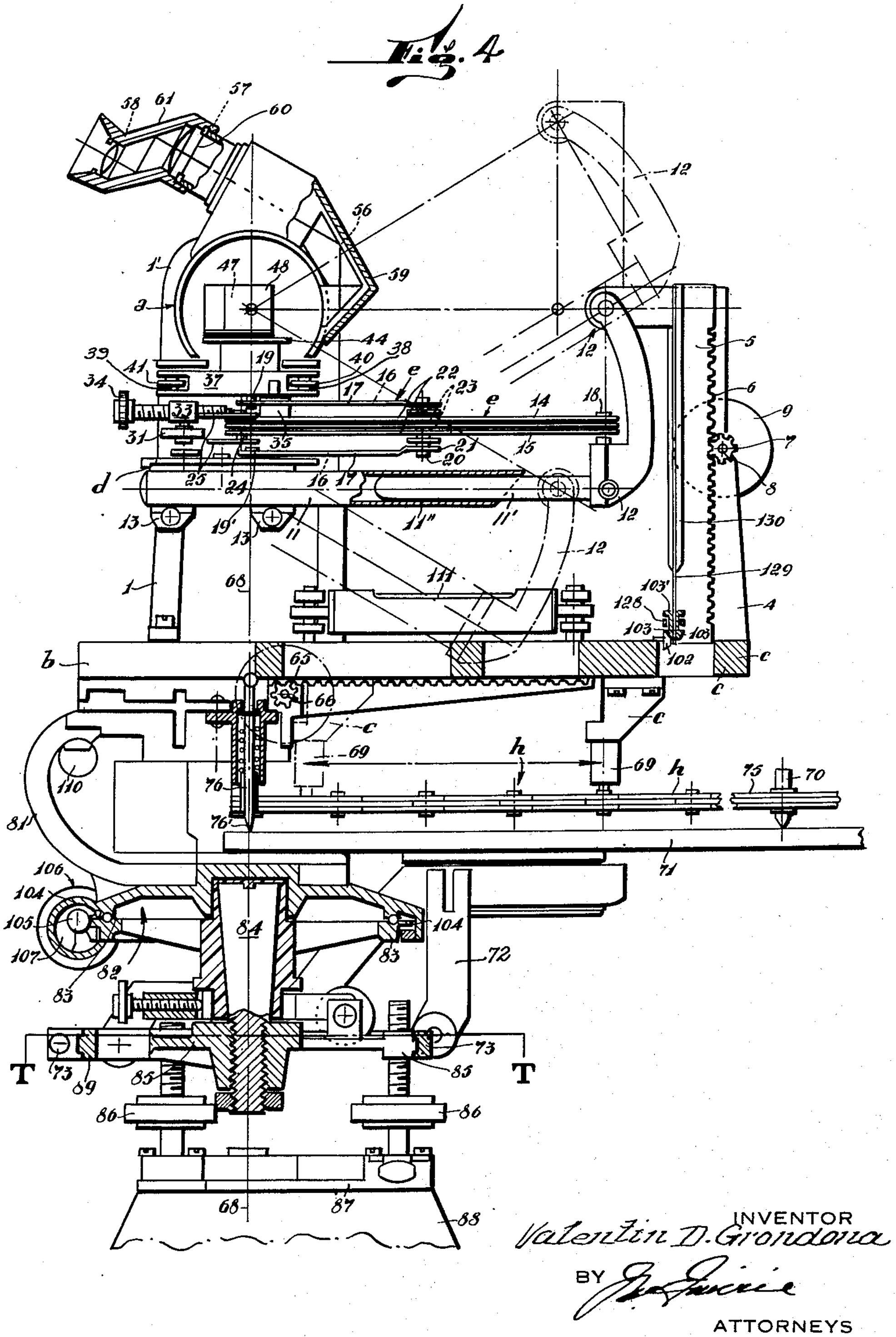
Fig. 4 is a sectional elevation of an embodiment corresponding to the general layout shown in Fig. 3, the section being taken through a midplane perpendicular to the telescope axis and certain parts outside the plane being also shown in section.

As can be seen in Figs. 3 and 4 the binocular telescope *a* rests on the supporting frames 1, on which it may rotate about its axis. Said frames 1 rest on the base or bed *b*. Said base has a guide 2 for displacement means comprising the main carriage *c* which supports at its forward end a column 3. Said column 3 is provided with a guide 4 wherein a secondary carriage 5 is located to be adjustable for height. Said secondary carriage is associated by means of rack 6 with a pinion 7 (see Fig. 4) the shaft 8 of which is actuated by a knob 9 on each side (only one being visible in the drawings). The secondary carriage 5 may be locked at any height by means of a schematically indicated brake at 10 in Fig. 5.

The secondary carriage 5 is articulated by means of a coupling member 12 to an arm 11' telescopically slidable in a tubular member 11'' of lever 11 (Fig. 4). The said lever 11 is coupled to a frame *d* by means of clamps 13. The clamps 13 are in rigid structural relationship with the telescope *a*, so that when the secondary carriage 5 is displaced by rotation of knob 9, the angular motion of the lever 11 causes displacement of a frame *d*, suitably coupled thereto, so that the telescope turns through a corresponding angle as shown in Fig. 4, wherein two additional positions are shown in broken lines.

The secondary carriage 5 is also connected to the inversor mechanism *e* by means of coupling member 12 and pivot 18. Furthermore the inversor mechanism *e* is coupled by means of link 25 with the lever system *f* (see Figs. 1, 4 and 7 to 9).

From the figures it will also be seen that in the articulated kite formed by the rods 14, 15, 16 and 17 of the inversor mechanism, the rods 14 and 15, of equal length, are pivoted to the pin 18, and the rods 16 and 17, also of equal length, are pivoted to the pin 19 which is fixed on frame *d*. The rods 14 and 16 are pivotally connected by pin 20 and the rods 15 and 17 are pivotally connected by pin 21.

Figure 7:
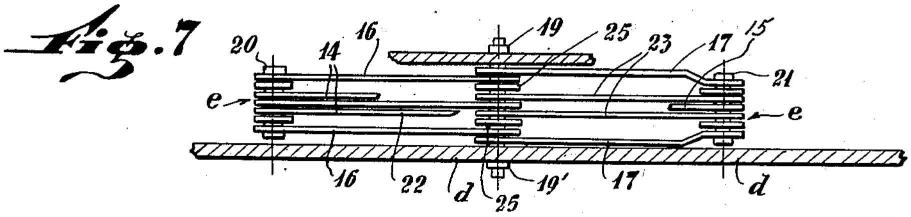
Fig. 7 is an elevation of the inversor mechanism of the construction substantially shown in Figs. 3 and 4.
Figures 8, 9:
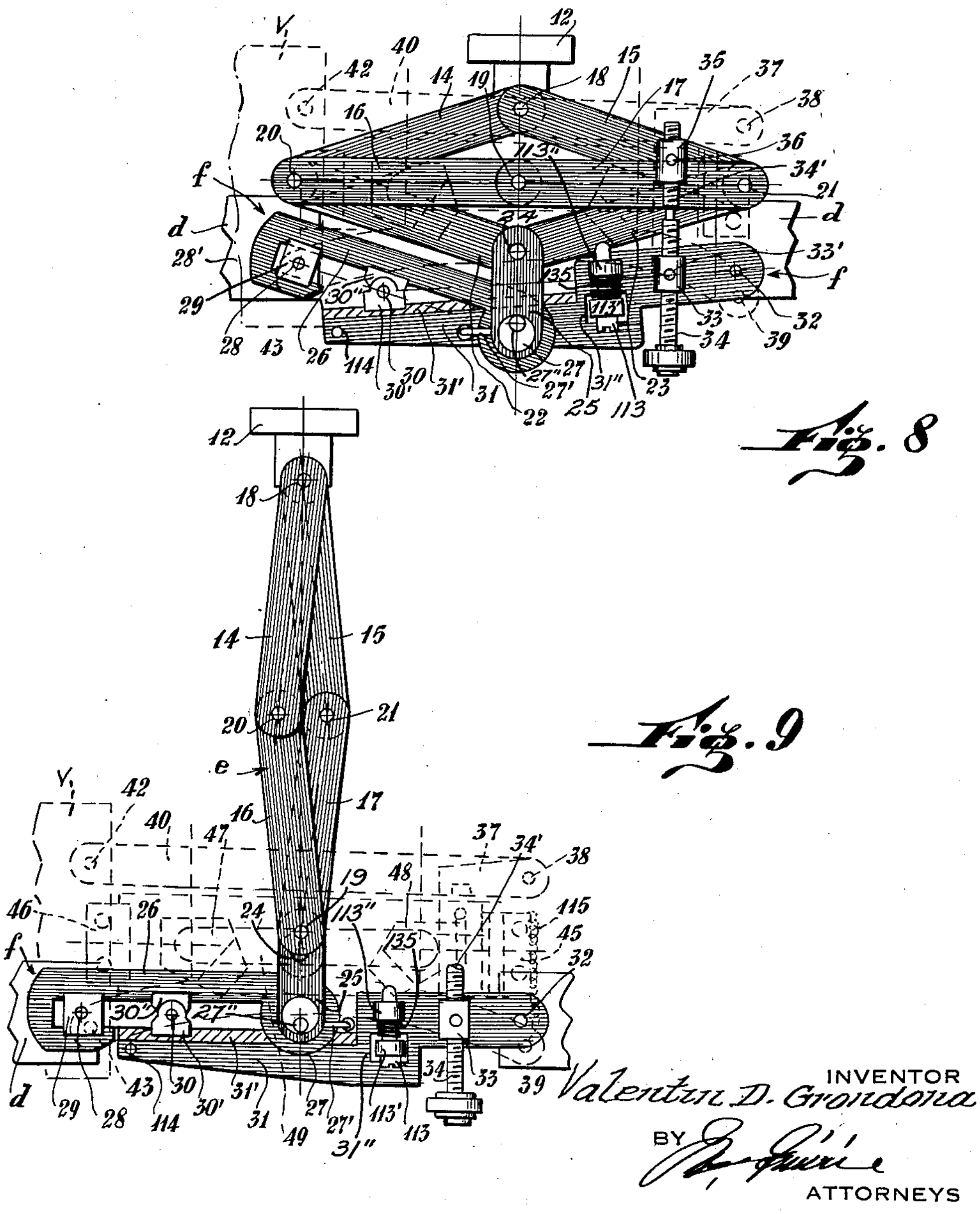
Fig. 8 is a plan view thereof.
Fig. 9 is the same mechanism also in plan view, but in the infinity position.

In practice, in order to avoid bending and twisting of the several bars, these bars are compensated. By "compensated" is to be understood that one of a pair of bars having a common linkage, is double. This would apply, say to bars 23 and 14, as shown in Fig. 7. However, to allow an extreme end position to be attained, the central bars 16, 17 cannot be treated in this manner but must both be doubled as indicated in said figure, so as to provide separate upper and lower common linkage points, so that in such construction there will be two pins 19, 19' with a space therebetween to allow passage of the end linkages of the diamond when moving the parts to said extreme end position, as shown in Fig. 9.

The diagonal which joins points L and O' (Fig. 1) of pins 18 and 19, is hereinafter called the main diagonal, whereas the diagonal which joins the middle of the pins 20 and 21 is called the secondary diagonal. The pins 20 and 21, further have each pivoted thereto, respectively two rods 22 and 23 which are of equal length and are pivoted to one another by the pin 24. The axis of pin 24 is situated outside the axes of the kite pivot pins 18 and 19.

The link 25 (Figs. 8 and 9) is situated on the prolongation of the main diagonal, which link determines the operative position of the inversor mechanism and said link is connected to the lever 26 of the translation lever system *f* by means of an eccentric cam 27 the axis of which is identified by 27''. Said cam 27 can be moved into two diametrically opposed positions by turning a handle 27' in one or other direction. Instead of an eccentric, any other appropriate means can be used for varying the distance between the pin 24 and the pivot axis of the lever 26 on the link 25. This distance is, in the position shown in Fig. 8 which is the ordinary operative position, greater than in the position shown in Fig. 9, which corresponds to the infinity position.

Since owing to the geometrical basis of the inversor mechanism *e*, the product of the segment determined by the pins 18 and 19, and the segment defined by the pins 19 and 24 is a constant magnitude, when the former increases the latter decreases. If the point to be observed is situated at infinity, the magnitude 18—19 would be immeasurably large while the magnitude 19—24 would be equal to zero. Since the infinity position of 18—19 cannot be achieved mechanically, the maximum extension of the main diagonal of the rhombus falls short of the infinity position the difference with respect to zero on the opposite segment being however corrected by means of a movement of the eccentric cam 27 upon actuation of the handle 27' which exactly offsets the residual difference noted.

Figure 10:
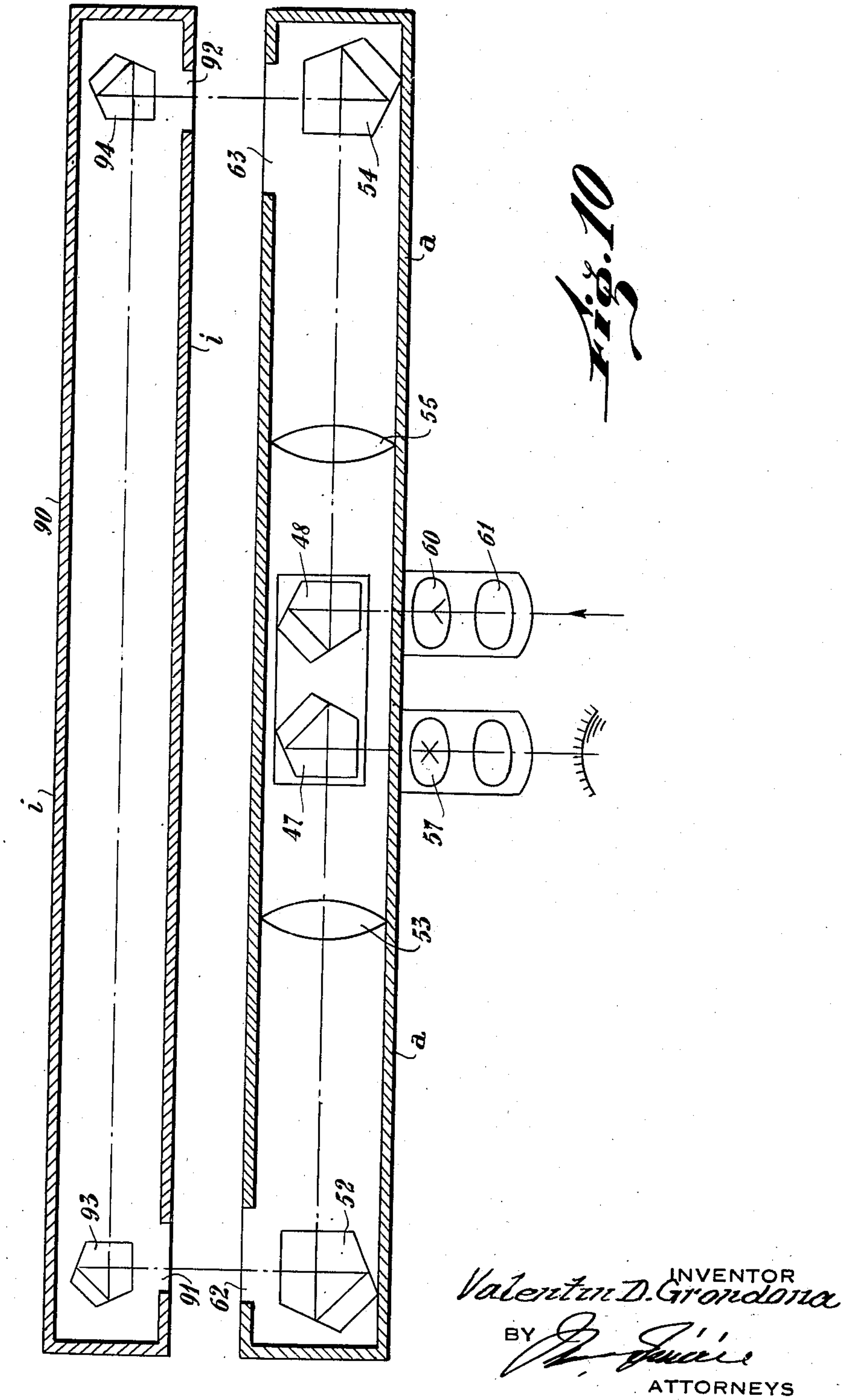
Fig. 10 is a sectional plan view of the telescope with an optical setting tester opposed to it.

In order to check the parallelism of the outer collimation axes, right pentagonal prisms 93, 94, respectively, are placed before the objective lenses 52 and 54, as shown in Fig. 10, and if one of the eye-pieces, for instance eye-piece 61, is illuminated, the image of reticle 60 of the first eye-piece appears in the other eye-piece 58 and on the second reticle 57, but turned over through 180°, and the coincidence of both images is obtained by changing the length of the linking magnitude JE (Fig. 1). These auxiliary prisms 93 and 94 may be arranged according to Fig. 10, in the end portions of a tube 90 closed at both ends, which tube is provided with two windows 91 and 92 and which are so arranged that they may face respectively the two windows 62 and 63 of the binocular telescope *a*, and which tube 90 can be set in front of said telescope *a* by means of two supports (not shown) which are arranged in front of said telescope *a*, and thus tube 90 constitutes an artificial sight *i*.

If one of the eye-pieces is illuminated, observation is then made through the other eye-piece, so that the image of the first reticle, which image is projected by the corresponding objective to infinity, is captured, after successive refractions of the rays, by the prisms 93 and 94, and conducted to the other reticle, and thus the coincidence of both images may be observed by the corresponding eye-piece. This coincidence is achieved by modifying, by means of the before mentioned adjusting-screw 34, the distance between the blocks 33 and 35, and thereby, as will be more clearly hereinafter described, the proper centering of the prisms 47 and 48 is ensured.

Upon withdrawal of the setting tester and bringing the cam 27' into the working position, by turning back the knob 27 (Fig. 8), the operator observes through both eye-pieces at the same time, and receives the subjective impression that the mark shown on the reticles is suspended in the space which encloses the landscape before him, and that as he moves the carriage *c* forward the mark moves away, the opposite happening when the carriage is moved backward.

Since every point in space is determined by three coordinates, the instrument is arranged to be oriented in azimuth and in elevation, so that on corresponding scales of azimuth and elevation as in the usual scale of range finders the real magnitudes of said coordinates may be read directly.

The mechanism of the range finder directly measures the segments of distance according to the parallax of the lines of sight, whereby the carriage *c* indicates the horizontal component of the distance and the secondary carriage 5 gives the altitude.

When the line of sight is inclined, a right angled triangle is formed, the hypotenuse of which lies in the direction of adjustment of the inversor mechanism *e*, the position of the prisms 47 and 48 being shifted.

Figure 11:
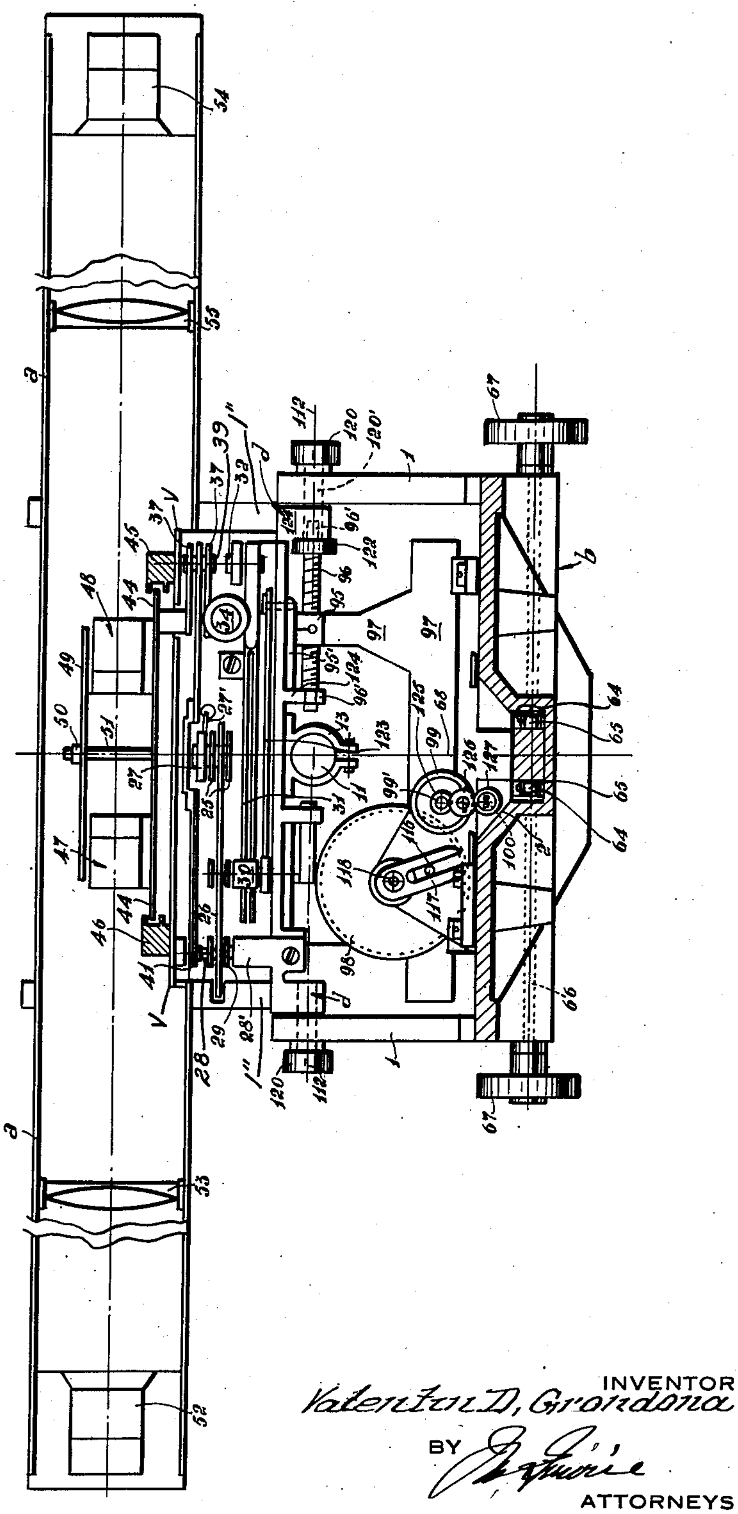
Fig. 11 is a rear view of the upper portion of the range finder in a slightly modified form with regard to Figs. 3 and 4, but corresponding substantially to the embodiment shown in Fig. 13.

According to Fig. 8, lever 26 of the translation lever system *f* is connected, as by slide-block 29 pivoted on pin 28, to a pillar or the like 28' secured to and upstanding from the frame *d* (see also Fig. 11). Said lever 26 is displaceable parallel to the direction of adjustment of the inversor mechanism *e*. As may be seen from Figs. 8 and 9, the effective length of the respective arm of the lever 26 will be varied by the sliding of the hooked end thereof in block 29. The variation is such as to maintain axis 27'' of cam 27 on the axis of symmetry of the inversor mechanism *e*.

Lever 26 by means of a cursor hinge 30, is connected to a guide-edge member 31' attached to one arm of a lever 31 which is pivoted by pin 32 to the frame *d* (see also Fig. 11).

The effective length of lever 31 may be varied by the displacement of the member 30' of hinge 30.

On the lever 31 a nut 33 is attached by means of a pivot 33' and is screw threaded to receive one portion of a differential screw 34, having another portion 34' of a different pitch cooperating with a block 35. By means of a pin 36 the block 35 is pivoted on a link 37 (see also Fig. 6), which by means of pins 38 and 39 connects bars 40 and 41 which by means of pins 42 and 43 are pivoted to the frame *v*, the assembly being so arranged that the four pins 38, 39, 42 and 43 define the vertices of a link parallelogram.

Frame *v* is directly supported by lateral supporting frames 1 (see Fig. 4) or indirectly by said frames 1 through frames 1'' in the embodiment of Fig. 11, wherein the horizontal axis of the telescope does not coincide with the horizontal rotation axis; said frames 1'' are supported by platform *d* mounted on shafts 120' supported by supporting frames 1, as will be later explained.

According to Figs. 8 and 9, hinge members 30' and 30'' which are pivoted to one another by pins 30, are guided rectilinearly along levers 26 and 31 respectively. In order to ensure that both the levers 26 and 31 remain parallel in the "infinity" position (Fig. 9), relative movement is arranged to take place, as hereinabove indicated, between pin 28 and slide block 29 and the hooked end of the lever 26. Lever 31 is provided with a guide edge 31', the visible part of which in Figs. 8 and 9 is of substantially the same width as that of lever 31, said guide edge 31' having a tongue (not visible) projecting beyond said lever 31 and being pivoted at one end to lever 31 through pivot pin 114. A block 113' mounted on the other end of said tongue of said guide edge 31' emerges through an opening 31'' of lever 31. A block 113'' similar to block 113' is integral with lever 31. A screw 113 connects said two blocks 113' and 113'', a spring 135 being provided therebetween to maintain blocks 113' and 113'' spaced apart in accordance with the screw adjustment. It is accordingly possible to vary the internal relationship of the whole of the lever system by the adjustment of the screw 113, or more particularly to adjust the transmission relationship between levers 26 and 31, since upon varying the distance between blocks 113' and 113'' through screw 113, the guide edge 31' will pivot about pivot pin 114 and thereby the sliding surfaces of hinge members 30' and 30'' are in different transmission relationship.

Figure 6:
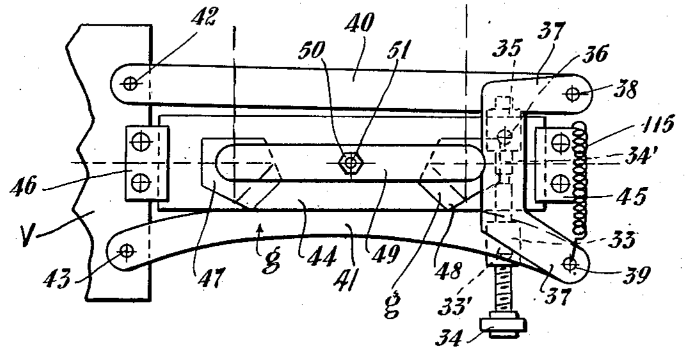
Fig. 6 is a plan view of the prism adjusting mechanism for the construction shown in Figs. 3 and 4.

As will be seen from Fig. 6, the link 37 is connected to platform 44, which is slidably mounted between guides 45 and 46, said platform 44 bearing the prisms 47 and 48 which are adapted to compensate the parallax effect when focussing the optical images.

Prisms 47 and 48 are secured in place on the platform 44 by a plate 49, nut 50 and screw 51. The device, generally indicated at *g*, is included in the interior of telescope *a* in such a position that the two prisms 47 and 48 have a position suitable for cooperation with the respective prisms 52 and 54 which define the datum line of the range finder (see Fig. 3). The prism 47 is located so as to receive the light rays from the prism 52 through the object lens 53, and the prism 48 is located so as to receive the light rays from the prism 54 through the object lens 55.

Any back-lash of the mechanism which may be caused by play, is eliminated by a spring 115 acting between the pin 39 and the frame *v* (Fig. 6).

According to Fig. 3, the light rays emerging from prisms 47 and 48 are transmitted to a system of prisms 56 so as to produce a real and erect image on the reticles 57 and 60, respectively, and this image, magnified by eye-pieces 58 and 61, respectively, is observed by the operator. Both reticles have an index, which indices are identical, and are intended to serve as centers of collimation. The telescope *a* has two windows 62 and 63 which are arranged opposite to the prisms 52 and 54 respectively, which act as angular reflectors and accordingly deflect the rays of light arriving transversely to the optical axis of the telescope, in the direction of said axis.

As shown in Figs. 4 and 11, the carriage *c* has below on both sides of its center a pair of racks 64 in mesh with a pinion 65 on the shaft 66. At each end of shaft 66 a knob 67 is attached for turning the shaft whereby carriage is displaceable transversely to the vertical axis 68 of the instrument.

Since the carriage *c* is housed in the base *b* independently of the frame *d* corresponding effects of movement are transmitted to the inversor *e* when the carriage is displaced, which influence also the position of the prisms 47 and 48 through the platform 44.

Therefore by turning knobs 67 the main carriage *c* will be displaced, and since vertical column 3 is mounted on carriage *c*, said column 3 will be displaced together with said carriage *c*. Column 3 is provided with the secondary carriage 5 having a coupling arm 12 which transmits the aforementioned movement to inversor mechanism *e* by means of pin 18 and said inversor mechanism *e* in its turn, transmits said movement to the lever system *f*.

As already explained the carriage *c* has on its underside a pin 69 which is operatively associated with a drawing instrument *h* which has a pencil or pen 70 the point of which acts on the board 71 which is mounted on the bracket 72 (Fig. 4) connected to a journal bearing ring 73 which is arranged concentrically with the vertical axis 68.

The drawing instrument *h* is composed of pantograph 75 of the lazy tongs type on the axis of symmetry of which lies a bearing pin 76, the pin 69 and the pen or pencil 70 (Fig. 3).

The bearing pin 76 has a sharp point 76′ coinciding with the axis 68 and is intended to mark the position of the vertical axis of the apparatus on the drawing board and on the paper placed thereon.

The carriage *c* has mounted on it a horizontal scale 77 (Fig. 3 and 5) which indicates by means of an index 78 on the base *b*, the distance to the point observed. The column 3 has a vertical scale 79 the graduations of which are intended to show the position of the secondary carriage 5 by means of an index 80 and thus indicates the elevation of the point observed.

The base or bed *b* rests on a support 81 which is carried by a rotary head 82 which with the limb 83 is mounted on the adjustable conical pin 84 screwed into a three-armed base 85, which by means of three foot-screws 86 rests on platform 87 attached to the top of the tripod 88. The shaft 84 is coaxial with the axis 68, and, as can be seen from Figs. 4 and 11, the base 85 has an annular rim 89 engaging the ring 73 supporting the bracket 72 which sustains the drawing board 71.

The change of working scale is effected (according to Fig. 11) by displacing the cursor 95, the slide 95′ of which is coupled to the hinge member 30′ (Figs. 8 and 9) which member 30′ by means of the hinge pin 30 established the association of the two levers 26 and 31.

Figure 13:
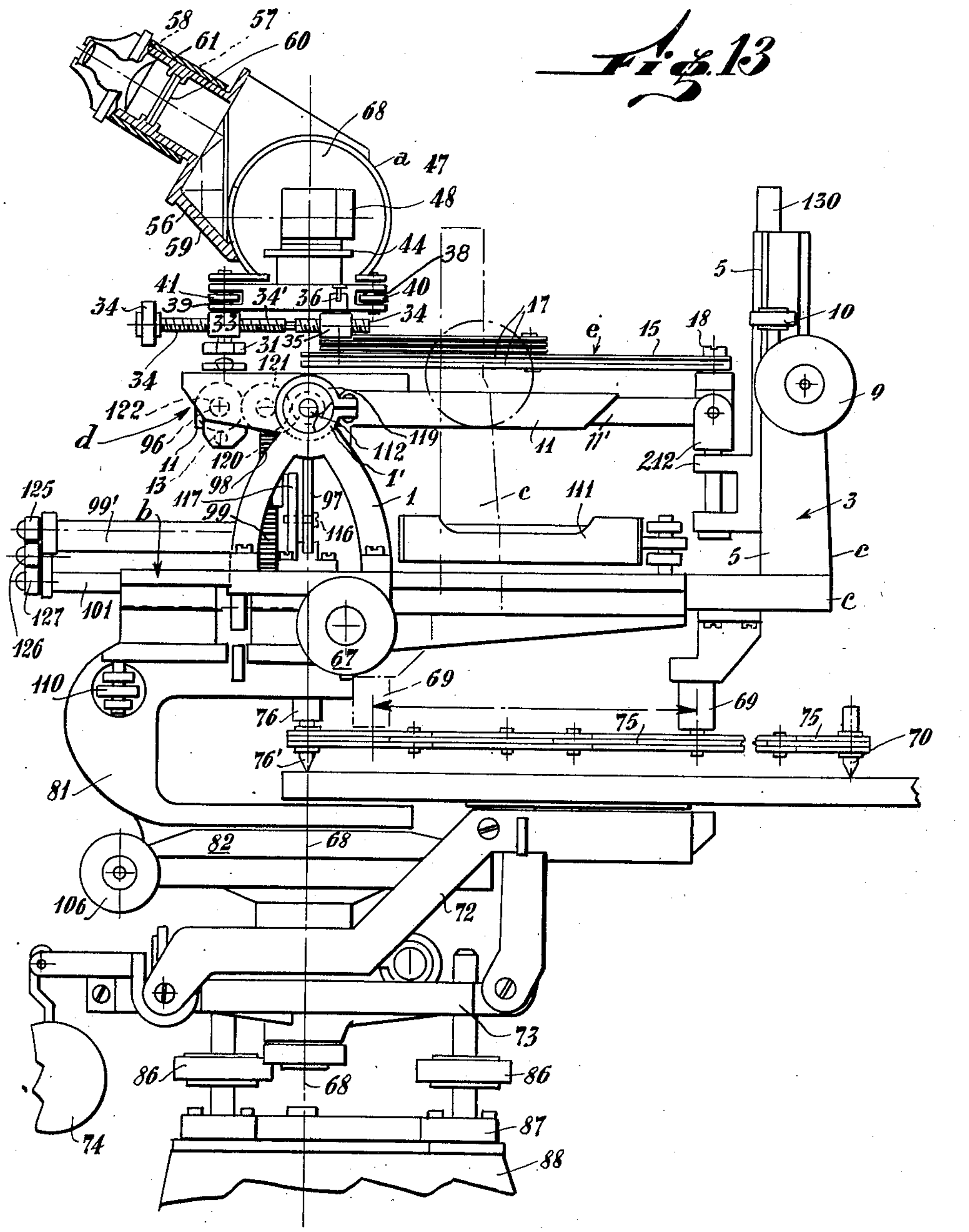
Fig. 13 is a side view of a modified form of the instrument of Fig. 4, shown partly in section. The reduction mechanism has been omitted in order to show the mounting of the optical system.

Before however, carrying on describing the aforementioned change of working scale, it is convenient to refer briefly to Fig. 13, which shows a slightly modified embodiment of the range finder hereinbefore described.

In said Fig. 13 the same reference characters indicate corresponding parts or elements.

The main difference with regard to Fig. 4 lies in the fact that in the embodiment shown in Fig. 4 the rotation of frame *d*, transmission device *e* and *f*, the telescope *a*, etc., is effected around the horizontal axis of the telescope *a* and therefore it is necessary that the coupling member 12 swing around its upper pivot and thereby it is possible that a certain amount of friction may be developed because said telescopical bar 11 may tend to move within the horizontal plane passing through its axis and crosswise to its proper movement.

This friction is avoided by the embodiment shown in Fig. 13, wherein said coupling member 12 of Fig. 4 is replaced by a Cardan coupling member identified by the reference numeral 212.

The advantage is achieved by displacing the horizontal rotation axis, which in Fig. 4 coincides with the horizontal axis of the binocular telescope *a*, downwardly to a level corresponding to the horizontal axis of the telescopical bar 11. As may be seen in said Fig. 13, obviously the supporting frame 1 is slightly modified with regard to Figs. 3 and 4 so that the upper end thereof forms a bearing 1′ for shaft 112 which constitutes said horizontal rotation axis.

Returning to the change of working scale, the cursor 95 engages by means of a nut the threads of the screw 96 the ends 96′ of which are journaled in bearings 124 of the frame *d*. Screw 96 has a gear 122 (Figs. 11 and 13). Said gear 122 by means of gear 121, is associated with gear 119 of shaft 120′ which is coaxial with the horizontal axis of the assembly 112.

By turning shaft 120′ by means of knob 120, rotation is caused of screw 96, through gears 119, 121 and 122, which causes displacement of the cursor 95, the slide 95′ of which varies the relationship between the levers 26 and 31 by means of the connecting rod 123 in the manner indicated.

As shown in Fig. 11, the cursor 95 is attached to member 97 having a pin 116, engaged by fork 117 mounted on a shaft 118 integral with a toothed wheel 98 meshing with gear 99, the shaft 99′ of which has mounted on it another gear 125 which by means of the intermediate gear 126 is associated with the gear 127 of a non-circular shaft 101 (Fig. 5) which is extensible with respect to and extends into drum 100 which is embedded in the base *b* and thereby rotatively supported. A more specific idea of how the drum is mounted can be achieved when the mounting of a corresponding scale drum for the vertical column is described, since both mountings are identical. Drum 100 is provided with several strips on its periphery on which are marked the different scales of distance 77 so that they may coact with the index 78 of base *b*.

Figure 5:
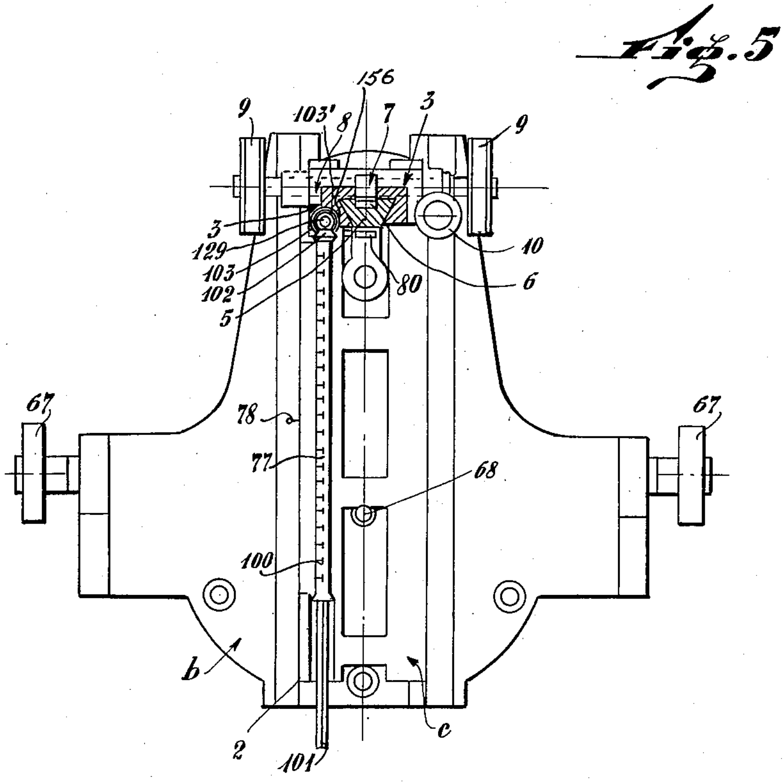
Fig. 5 is a plan of the lower portion of the frame in a slightly modified form.

Drum 100, as shown in Fig. 5, terminates in a bevel gear 102 meshing with a bevel gear 103 which, as shown in Fig. 4, is formed with a tubular shaft 103′ journaled in the bearing 128. The shaft 103′ slidably receives the prismatic shaft 129 of drum 130, which is rotatably mounted to the column 5; for example as shown, drum 130 is rotatable in a vertical circular groove 156 in column 5.

A similar construction may be adopted for journalling in the frame or base *b* the end of drum 100 nearer column 5. Drum 130 has several strips with several scales of altitude. However, in Fig. 3 the drum has not been illustrated but only one scale 130′ has been shown.

With this transmission ratio between the cursor 95 and the mechanism which extends from member 97 to the drums 100 and 130, the change of scale is obtained together with the adjustment of the translation relationship between the levers 26 and 31. That is to say, that when the knob 120 is actuated, the movement of the cursor 95 is transmitted on the one hand, that is to say by the connecting rod 123, to the cursor member 30′ (which connects the lever 26 and 31 by means of a pin 30), and on the other hand, this movement is transmitted by means of member 97, pin 116, fork 117, toothed wheel 98 and gears 99, 125, 126 and 127 to the drum 100 which, in response to the adjustment exposes one or another of the distance scales. Since drum 130 is coupled to drum 100, and is provided with altitude scales, the movement of knob 120 also causes drum 130 to expose the corresponding altitude scale.

This mechanical transmission does not interfere with the motion of the main carriage *c* in its path, nor that of the secondary carriage 5, because on the one hand, the shaft of the drum 100 is extensible so that when the carriage *c* advances, the coupling is maintained in any of its positions. And on the other hand, the assembly of the hollow shaft 103' and the prismatic shaft 129, allows the connection between them to be maintained in spite of upward and downward movement of the carriage 5.

The azimuth movement is obtained by means of a toothed ring 104 (Fig. 4) which forms the periphery of the rim 83 and cooperates with a tangential worm 105 connected with a drum 106. On the rim 83 the degrees of rotation may be read off while the fractions of a degree are indicated on the drum 106. In order to facilitate rapid movements of the rotatable head 82, the micrometer screw or worm 105 is eccentrically journalled in cam shaft 107, which in its turn is journalled in the rotatable head 82, so that rotation of the cam shaft 107 will move the micrometric worm 105 out of contact with the ring 104.

Figure 12:
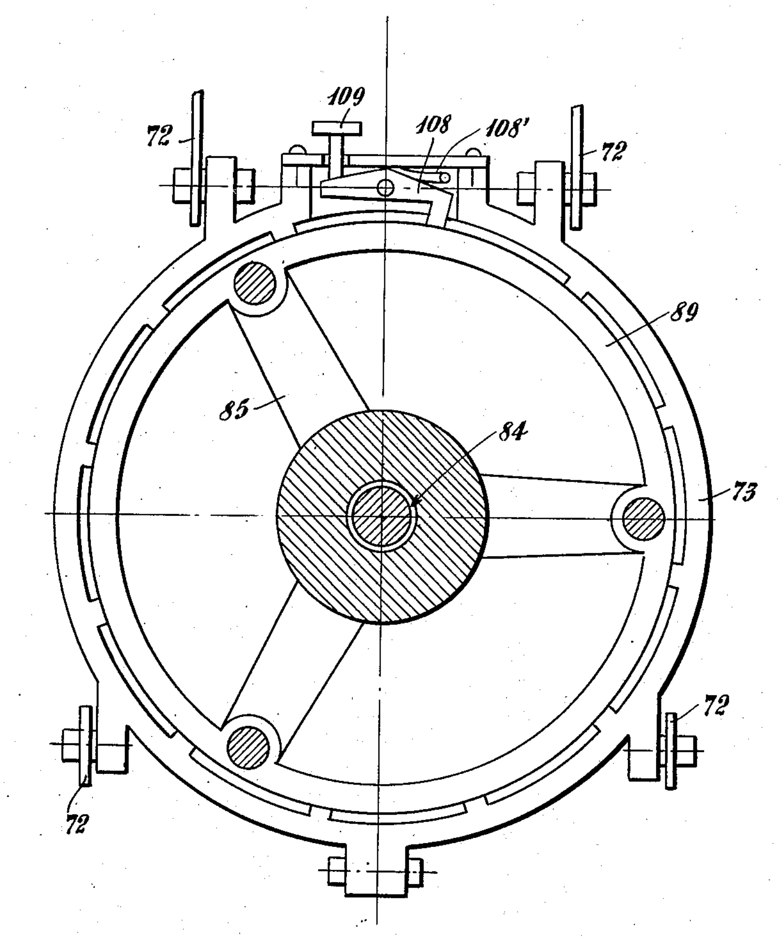
Fig. 12 is a cross section along line T—T of Fig. 4.

The board 71 of the mapping device may be rotated by rotation of the journal bearing ring 73 around the ring 89 (Fig. 12). Ring 73 is provided with a detent 108 which under pressure of the spring 108', presses against the ring 89. The detent may be retracted by merely pressing a button 109. Ring 89 is provided with notches (not shown) to receive the detent 108, which notches correspond to equal sectors numbered in degrees.

The levels 110 and 111 disposed at 90° to each other (Fig. 4), complete the accessories of the instrument.

Before the range finder leaves the factory, it is advisable to ascertain whether the constants of the instrument agree with those of the calculations. The Formula 4:

$$D=S.t$$

demands a good check of the constant magnitude S (scale of drawing). This range finding constant is determined by four constant magnitudes: $t$, $f$, $m$ and $n$ and a parameter $p$, which depends on the position of the cursor I (Fig. 1) which may be varied at will. It is not necessary to investigate all possible sources of errors, since one or more of them occurring in any of the four constants is compensated for by varying $p$ within narrow limits. For this purpose a series of vertical staffs in line is set out in the terrain at distances measured beforehand, and the range finder is placed at one end of the series. On the scale of distances a predetermined value is set off, and by displacing the cursor I the images obtained by the instrument are brought into coincidence with that of the corresponding mark of the terrain. It is not necessary, thereafter, to perform this checking operation again unless it is suspected that the guides or articulations have become affected by excessive wear and tear.

A small level is conveniently mounted on the telescope of the instrument in order to ensure that the zero of the altitude scale coincides with the horizontal position of the two lines of sight. Any correction that may be required is made by turning through a small angle the casing 59 in which the prisms 56 are fixedly mounted together with the reticles and the eye-pieces (Fig. 2).

The arrangement and form of the prisms may differ from that shown, provided that they obey the same principle as has been set forth. Moreover these may be replaced wholly or in part by optical mirrors fulfilling the same reflecting functions as the prisms.

The compensation of the optical parallax has been achieved by transverse displacement of a pair of prisms. This does not exclude the fact that for the same purpose use may be made of movable wedges, oscillating plates, double rotary prisms and other known means.

The inversor mechanism may be carried out in a different embodiment from the above described, provided that such embodiment is capable of performing the same function.

The mapping frame or drawing board, may also be located below the mechanism so that the range finder instead of embracing a horizontal sector of about 120°, will embrace 360°.

I claim:

1. A surveying instrument provided with a range finder having a binocular telescope including an optical system and a parallax measuring member arranged to cooperate with said optical system to measure parallax therein, a survey recording means for recording the survey, a range reducing transmission mechanism operatively associated with said parallax measuring member and adapted to reduce the range of a point of the terrain in a given ratio, said transmission mechanism being further operatively associated with said survey recording means and comprising an inversor mechanism and an adjustment device for said optical system and in structural relationship with said range reducing transmission mechanism, and displacement means operatively associated with said transmission mechanism whereby actuation of said displacement means will cause shifting of said parallax measuring member through said transmission mechanism to measure parallax and actuation of said recording means, likewise through said transmission means, to record the survey.

2. A surveying instrument provided with a range finder having a binocular telescope including an optical system and a parallax measuring member arranged to cooperate with said optical system to measure parallax therein, a drawing apparatus for recording the survey, a range reducing transmission mechanism operatively associated with said parallax measuring member and adapted to reduce the range of a point of the terrain in a given ratio, said transmission mechanism being furthermore operatively associated with said drawing apparatus, said transmission mechanism comprising an inversor mechanism having a driving end member, a driven member and an adjustment device for said optical system, said inversor mechanism being designed to convert any displacement impressed on its driving end member into an inversely proportional displacement of its driven member, and displacement means operatively associated with said driving end member, whereby actuation of said displacement means will cause shifting of said parallax measuring member through said transmission mechanism to measure parallax, and actuation of said drawing apparatus through said displacement means to record the survey.

3. A surveying instrument provided with a range finder having a binocular telescope including an optical system and a parallax measuring member arranged to cooperate with said optical system to measure parallax therein, a survey recording means, a range reducing transmission mechanism operatively associated with said parallax measuring member and adapted to reduce the range of a point of the terrain in a given ratio, said transmission mechanism comprising an inversor mechanism, said instrument having also a bed, a guide forming part of said bed, a main carriage slideably located in said guide and connected to said survey recording means, a vertical column mounted on said main carriage, a guide arranged in said vertical column, a secondary carriage slideably mounted in the last mentioned guide, said secondary carriage being operatively associated with said inversor mechanism of the transmission mechanism, independent manually operated actuating means connected respectively to the main carriage and secondary carriage, the arrangement being such that movement of the secondary carriage displaces said parallax measuring member and movement of the main carriage displaces said survey recording means and also displaces said parallax measuring member through said secondary carriage.

4. A surveying instrument provided with a range finder having a binocular telescope including an optical system and a parallax measuring member arranged to cooperate with said optical system to measure parallax therein, a range reducing transmission mechanism operatively associated with said parallax measuring member and adapted to reduce the range of a point of the terrain in a given ratio, said transmission mechanism comprising an inversor mechanism including an articulated kite structure formed by two pairs of rod members, the rod members of each pair being of equal length, said kite structure having a main diagonal and a secondary diagonal, the end of each diagonal coinciding with an articulation and further comprising two equally long rod members pivoted together at one end, and articulately connected to the opposed articulations corresponding to the secondary diagonal of the kite structure, the axis of the pivoted articulation of the last mentioned two rod members being situated outside the kite and on the prolongation of the main diagonal thereof, a drawing apparatus operatively associated with said inversor mechanism, and displacement means operatively associated with said transmission mechanism whereby actuation of said displacement means will cause shifting of said parallax measuring member through said transmission mechanism to measure parallax and actuation of said drawing apparatus likewise through said transmission means to record the survey.

5. A surveying instrument provided with a range finder having a binocular telescope, including an optical system and a parallax measuring member arranged to cooperate with said optical system to measure parallax therein, a frame in rigid structural relation with said telescope, an inversor mechanism, a survey recording means, a transmission lever system comprising a first lever and a second lever connected to each other by an articulation, said first lever being connected on the one hand to said frame and on the other hand to said inversor mechanism, whilst said second lever is connected on the one hand likewise to said frame and on the other hand to the parallax measuring member, said inversor mechanism having a driving member and a driven member, said driven member linking the inversor mechanism with said first lever, and said driving member being operatively associated with said means for recording surveys, said inversor mechanism being designed to convert any displacement impressed on the driving member into an inversely proportional displacement of its driven member, and means for operating said driving end of the inversor mechanism.

6. A surveying instrument provided with a range finder having a binocular telescope, including an optical system and a parallax measuring member arranged to cooperate with said optical system to measure parallax therein, a frame in rigid structural relation with the telescope, an inversor mechanism, a scale setting control device, a survey recording means, a transmission lever system comprising two levers, a hinge-like cursor having two hinge members each of them being connected to one of said two levers, one of said levers being connected on the one hand to said frame and on the other hand to said inversor mechanism, whilst the other lever is connected on the one hand likewise to said frame, and on the other hand to the parallax measuring member, the hinge member connected to the last mentioned lever being coupled to said scale setting control device, said scale setting control device being operatively associated with said hinge-like cursor and actuatable to change the position of said hinge-like cursor with regard to said two levers of the transmission lever system and thereby to vary the transmission relationship of said transmission lever system, said inversor mechanism being operatively associated with said survey recording means, and manually operated actuating means operable to cause shifting of said parallax measuring member through said inversor mechanism and transmission lever system and likewise to cause shifting of said survey recording means.

7. A surveying instrument provided with a range finder having a binocular telescope, including an optical system and a parallax measuring member arranged to cooperate with said optical system to measure parallax therein, a survey recording means, a transmission lever system, an inversor mechanism, a coupling member and eccentric device, said transmission lever system being operatively associated on the one hand with said parallax measuring member and on the other hand with said inversor mechanism through said coupling member, said coupling member being provided with said eccentric device, said eccentric device being adapted to vary the distance existing between said inversor mechanism and said coupling member, said inversor mechanism being further operatively associated with the survey recording means.

8. A surveying instrument provided with a range finder having a binocular telescope, including an optical system and a parallax measuring member arranged to cooperate with said optical system to measure parallax therein, a frame in rigid structural relation with said telescope, an inversor mechanism, a survey recording means, a transmission lever system comprising two levers, a hinge-like cursor having two hinge members each of said members being connected to one of said two levers, one of said levers being connected on the one hand to said frame and on the other hand to said inversor mechanism whilst the other lever is connected on the one hand likewise to said frame and on the other hand to the parallax measuring member, a scale setting control device, the hinge member connected to the last mentioned lever being coupled to said scale setting control device, said scale setting control device being operatively associated with said hinge-like cursor and actuatable to change the position thereof with regard to said two levers of the transmission lever system and thereby to vary the transmission relationship of said transmission lever system, said device comprising a cursor provided with an index, a scale arranged on said frame and opposite said index, which index is adapted to indicate the scale under which the instrument is operating, said inversor mechanism being operatively associated with said survey recording means.

9. A surveying instrument provided with a range finder having a binocular telescope including an optical system and a parallax measuring member arranged to cooperate with said optical system to measure parallax therein, a survey recording means, a frame in rigid structural relation with said telescope, an inversor mechanism, a transmission lever system comprising a first lever and a second lever connected to each other by an articulation, said first lever being connected, on the one hand, to said frame, and on the other hand to said inversor mechanism whilst the second lever is connected, on the one hand, likewise to said frame and on the other hand to the parallax measuring member, said inversor mechanism having a driving member and a driven member, said driven member linking the inversor mechanism with said first lever of the transmission lever system, said instrument having also a bed, a guide forming part of said bed, a main carriage slideably located in said guide and connected to said survey recording means, a vertical column mounted on said main carriage, a guide arranged in said vertical column, a secondary carriage slideably mounted in the last mentioned guide, said secondary carriage being connected to the driving member of the inversor mechanism, and independent manually operated actuating means connected respectively to the main carriage and the secondary carriage and actuable to cause shifting of said survey recording means and of said parallax measuring member, through said inversor mechanism and said transmission lever system.

10. A surveying instrument rotatable about a vertical axis and provided with a range finder having a binocular telescope including an optical system and a parallax measuring member arranged to cooperate with said optical system to measure parallax therein, a drawing apparatus, a range reducing transmission mechanism operatively associated with said parallax measuring member and adapted to reduce the range of a point of the terrain in a given ratio, said range reducing transmission mechanism comprising an inversor mechanism and an adjustment device for said optical system and in structural relationship with said inversor mechanism, said instrument having also a bed, a guide forming part of said bed, a main carriage slideably located in said guide and radially displaceable with regard to said vertical axis, said main carriage being connected to said drawing apparatus, a vertical column mounted on said main carriage, a guide arranged in said vertical column, a secondary carriage slideably mounted in the last mentioned guide, said secondary carriage being operatively associated with said inversor mechanism of the range reducing transmission mechanism, independent manually operated actuating means connected respectively to the main carriage and secondary carriage and actuable to cause shifting of said parallax measuring member, through said inversor mechanism and said transmission lever system and also to cause shifting of said drawing apparatus, said drawing apparatus being constituted by means of a plurality of rods in form of a pantograph of the lazy-tongs type, one end of which coincides with the vertical axis of the instrument and the other end being provided with a writing point.

11. A surveying instrument provided with a range finder having a binocular telescope, including an optical system and a parallax measuring member arranged to cooperate with said optical system to measure parallax therein, a frame in rigid structural relation with the telescope, an inversor mechanism, a scale setting control device, a survey recording means, a transmission lever system comprising a first lever and a second lever, a hinge-like cursor having two hinge members each of said members being connected to one of said two levers, said first lever being connected, on the one hand, to said frame and, on the other hand, to said inversor mechanism whilst the second lever is connected, on the one hand, likewise to said frame and, on the other hand, to the parallax measuring member, the hinge member connected to said second lever being coupled to said scale setting control device, said scale setting control device being operatively associated with the hinge-like cursor and actuatable to change the position thereof with regard to said two levers of the transmission lever system and thereby to vary the transmission relationship of said transmission lever system, said instrument having also a bed, a guide forming part of said bed, a main carriage slidably located in said guide and connected to said survey recording means, a vertical column mounted on said main carriage, a guide arranged in said vertical column, a secondary carriage slideably mounted in the last mentioned guide, said secondary carriage being operatively associated with said inversor mechanism, independent manually operated actuating means for the main carriage and secondary carriage, actuable to cause shifting of said parallax measuring member through said inversor mechanism and said transmission lever system and also to cause shifting of said survey recording means, said scale setting control device including a horizontal drum rotatably mounted on the bed adjacent the main carriage, a member operatively associated with said drum and in engagement with said cursor, a vertical drum embedded in the vertical column, and means drivingly coupling said drums, each of said drums being provided with a plurality of strips on their respective peripheries, the strips on said horizontal drum bearing different range scale markings for registry with an index on said main carriage, and the strips on said vertical drum bearing different altitude scale markings for registry with an index on the secondary carriage.

12. A surveying instrument provided with a range finder having a horizontal binocular telescope having a horizontal optical axis and including an optical system, a platform supporting a pair of prisms in rigid structural relationship with said platform, said pair of prisms constituting a parallax measuring member adapted to cooperate with said optical system, said platform being displaceable perpendicularly to the optical axis of the telescope, survey recording means, a range reducing mechanism operatively associated with said platform and adapted to reduce the range of a point of the terrain in a given ratio, said transmission mechanism being further operatively associated with said survey recording means and comprising an inversor mechanism and an adjustment device for said optical system, and displacement means operatively associated with said transmission mechanism whereby actuation of said displacement means will cause shifting of said parallax measuring member through said transmission mechanism to measure parallax, and actuation of said recording means, likewise through said transmission means to record the survey.

VALENTIN DOMINGO GRONDONA.

REFERENCES CITED

The following references are of record in the file of this patent:

UNITED STATES PATENTS

| Number | Name | Date |
|---|---|---|
| 735,829 | Schrader | Aug. 11, 1903 |
| 829,400 | Von Hinke | Aug. 28, 1906 |
| 2,157,634 | Schulze | May 9, 1939 |